United States Patent
Uehara (10) Patent No.: US 9,116,682 B2
(45) Date of Patent: Aug. 25, 2015

(54) UNINTERRUPTIBLE POWER SUPPLY DEVICE WITH ALERTS ABNORMAL END OF POWER-OFF PROCESSING OF A COMPUTER SYSTEM

(71) Applicant: FUJITSU LIMITED, Kawasaki-shi (JP)

(72) Inventor: Mikio Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 322 days.

(21) Appl. No.: 13/803,409

(22) Filed: Mar. 14, 2013

(65) Prior Publication Data

US 2013/0198537 A1 Aug. 1, 2013

Related U.S. Application Data (63) Continuation of application No. PCT/JP2010/066492, filed on Sep. 24, 2010.

(51) Int. Cl.
*G06F 1/30* (2006.01)
*G06F 1/26* (2006.01)

(52) U.S. Cl.
CPC . *G06F 1/30* (2013.01); *G06F 1/263* (2013.01)

(58) Field of Classification Search
CPC .................................................... G06F 1/3203
USPC ........................................................ 713/300
See application file for complete search history.

(56) References Cited

U.S. PATENT DOCUMENTS

| 5,315,161 | A | * | 5/1994 | Robinson et al. | 307/66 |
| 5,923,099 | A | * | 7/1999 | Bilir | 307/64 |
| 6,274,949 | B1 | * | 8/2001 | Lioux et al. | 307/64 |
| 7,411,314 | B2 | * | 8/2008 | Dunstan | 307/64 |
| 8,648,494 | B2 | * | 2/2014 | Chiang | 307/64 |
| 2002/0143410 | A1 | * | 10/2002 | Yance et al. | 700/11 |

FOREIGN PATENT DOCUMENTS

| JP | 63-251845 | A | 10/1988 |
| JP | 6-161610 | A | 6/1994 |
| JP | 2000-316239 | A | 11/2000 |
| JP | 2007-272756 | A | 10/2007 |
| JP | 2009-183044 | A | 8/2009 |

OTHER PUBLICATIONS

Shibuya Kiyoshi, Uninterruptible Power Source Device and Power Source Management Method, Oct. 18, 2007, Japanese Patent application, pp. 5.*
Japanese Office Action mailed Oct. 29, 2013 for corresponding Japanese Application No. 2012-534865, with Partial English-language Translation.
International Search Report, mailed in connection with PCT/JP2010/066492 and mailed Dec. 28, 2010.

* cited by examiner

*Primary Examiner* — Suresh Suryawanshi
(74) *Attorney, Agent, or Firm* — Fujitsu Patent Center (57) ABSTRACT

An uninterruptible power supply device has a main power source and a backup power source and supplies power to a computer. The uninterruptible power supply device has an output power detection circuit and a control circuit which measures time until a completion of the power-off process of the computer. The control circuit alerts or extends a set time until the power-off according to the measured time.

10 Claims, 9 Drawing Sheets

UNINTERRUPTIBLE POWER SUPPLY DEVICE WITH ALERTS ABNORMAL END OF POWER-OFF PROCESSING OF A COMPUTER SYSTEM

CROSS-REFERENCE TO RELATED APPLICATION

This application is a continuation application of International Application PCT/JP2010/066492 filed on Sep. 24, 2010 and designated the U.S., the entire contents of which are incorporated herein by reference.

FIELD

The embodiments discussed herein are related to an uninterruptible power supply device and a computer system.

BACKGROUND

In order for a computer to operate successfully, it is necessary to supply stable power to the computer. For a supply of the stable power to the computer, the uninterruptible power supply (UPS: Un-interruptible Power Supply) device has been used. The uninterruptible power supply device (hereinafter referred to as UPS) is provided with a battery as a backup power. For this reason, by switching the power supply to the battery, in the event of a power failure, it is possible to supply power to the computer.

In view of power saving, it is effective to cut the power supply to the computer from the UPS, when the computer does not require the power supply. Therefore, a method of indicating the power-off from the computer to the UPS has been proposed. For example, at the time of power-off, the computer software issues command to cut the UPS output after a few minutes (setting time), to the UPS. When the setting time elapses after receiving the command, the UPS cuts the power supply output unconditionally.

Within the designated time, the computer saves data, performs end processing of the application, and stops OS (Operating System). That is, because the computer is unable to control the UPS, after the OS is stopped, the setting time of the UPS was set to longer time with a margin.

RELATED ART

Japanese Laid-open Patent Publication No. 06-161610

The time required to shut down the computer system, changes with progress of the operation time of the system in general. Traditionally, variations in the time required to shut down which increases with the progress of the operation was relatively small. Therefore, it was able to safely shut down the computer system in the setting time which is set once.

However, for example, in a computer which includes a database, there is a tendency that as the amount of data increases, the time in order to successfully complete the database increases. Therefore, there is a possibility that the shutdown time of the computer software is extended than expected time. Because the UPS turns off the output voltage when the setting time has elapsed even if the shutdown time is extended than the expected time, the power of the computer system is cut off during the operation of the computer system when setting a short setting time of the shutdown. Therefore, abnormal shut down may be occurred.

The battery is able to be charged, but the ability to accumulate the power is reduced with passing of time. For example, the UPS has been used for the lead-acid battery as the backup battery in general. The lead-acid battery has a characteristics of which the capacity to accumulate power is reduced over time. A life characteristic is a characteristic such that the capacity of the end-of-life is about half with respect to the initial capacity.

In a case that the setting time of the shutdown is increased, when backup is performed by the battery at the power outage, the power supply to the computer system will stop before the setting time according to the accumulated capacity of the battery. Therefore, the power supply of the computer system is cut off during the operation of the computer system when the shut down time of the computer software is extended than the expected time. Therefore, abnormal shut down also may be occurred.

SUMMARY

According to an aspect of the embodiments, an uninterruptible power supply device includes a main power supply circuit for supplying power to a computer, a backup power supply circuit for supplying the power to the computer instead of the main power supply circuit in an event of a power outage, a detection circuit which detects the output power supplied to the computer, and a control circuit which cuts the power supply to the computer after a set time in response to a disconnection instruction of the power from the computer, monitors the output power which is detected by the detection circuit, measures a time until a completion of a power-off processing of the computer, and alerts abnormal end of the power-off processing of the computer due to the cut the power supply according to the set time based on the measured time.

Further, according to another aspect of the embodiments, an uninterruptible power supply device includes a main power supply circuit for supplying power to a computer, a backup power supply circuit for supplying the power to the computer instead of the main power supply circuit in an event of a power outage, a detection circuit which detects the output power supplied to the computer, and a control circuit which cuts the power supply to the computer after a set time in response to a disconnection instruction of the power from the computer, monitors the output power which is detected by the detection circuit, measures a time until a completion of a power-off processing of the computer, extends the set time based on the measured time, and cuts the power supply.

In addition, according to the other aspect of the embodiments, a computer system includes an uninterruptible power supply device which supplies power to a computer and the computer which performs a power-off processing after transmitting a disconnect instruction of the power to the uninterruptible power supply device. And the uninterruptible power supply device includes a main power supply circuit, a backup power supply circuit for supplying the power to the computer instead of the main power supply circuit in an event of a power outage, a detection circuit which detects the output power supplied to the computer, and a control circuit which cuts the power supply to the computer after a set time in response to the disconnection instruction of the power from the computer, monitors the output power which is detected by the detection circuit, measures a time until a completion of a power-off processing of the computer, and alerts abnormal end of the power-off processing of the computer due to the cut the power supply according to the set time based on the measured time.

In addition, according to the other aspect of the embodiments, a computer system includes an uninterruptible power supply device which supplies power to a computer and the computer which performs a power-off processing after transmitting a disconnect instruction of the power to the uninterruptible power supply device. And the uninterruptible power supply device includes a main power supply circuit, a backup power supply circuit for supplying the power to the computer instead of the main power supply circuit in an event of a power outage, a detection circuit which detects the output power supplied to the computer, and a control circuit which cuts the power supply to the computer after a set time in response to the disconnection instruction of the power from the computer, monitors the output power which is detected by the detection circuit, measures a time until a completion of a power-off processing of the computer, extends the set time based on the measured time, and cuts the power supply.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be described in order of a computer system, disconnect process of the power in the uninterruptible power supply circuit according to a first embodiment, the disconnect process according to a second embodiment, the disconnect process according to a third embodiment, other embodiments, but the disclosed computer system and uninterruptible power supply circuit are not limited to the embodiments.

(Computer System)

Figure 1:
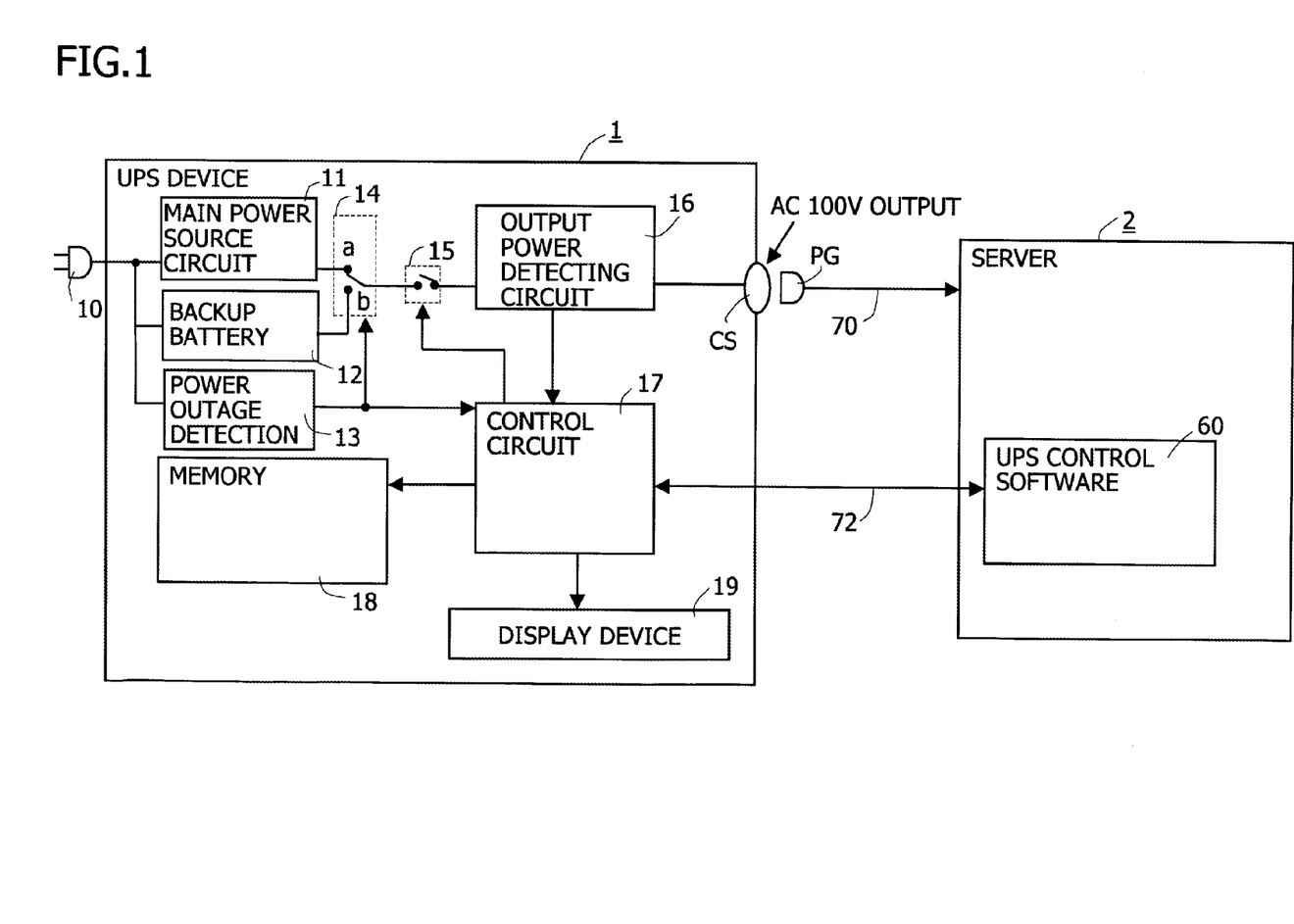
FIG. 1 is a block diagram of a computer system according to a embodiment.
Figure 2:
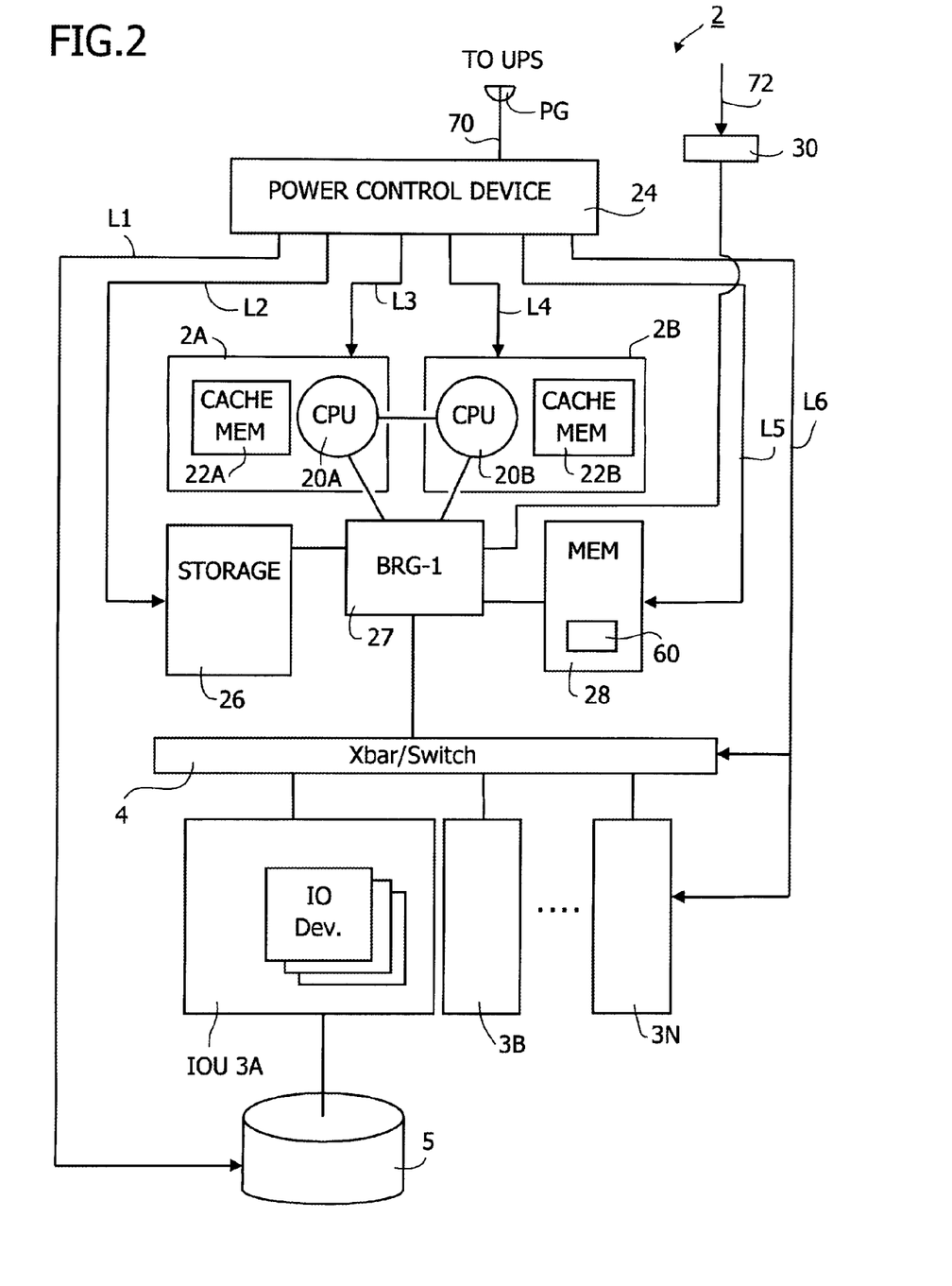
FIG. 2 is a block diagram of a computer in FIG. 1.

FIG. 1 is a block diagram of the computer system according to the embodiment. FIG. 2 is a block diagram of a server in FIG. 1. FIG. 1 and FIG. 2 illustrate a server system as the computer system. As illustrated by FIG. 1, an uninterruptible power supply circuit (hereinafter referred to as UPS) 1 supplies power to a server 2. The UPS 1 is connected to a commercial power supply by a power plug 10. A power plug PG of a cable 70 of the server 2 is connected to an outlet CS of the UPS 1. Thus, the server 2 receives the power from the UPS 1.

Also, the server 2 connects the UPS 1 through a control interface line 72. The server 2 executes a UPS control software 60 UPS, and transmits and receives control signals to and from the UPS 1 via the control interface 72. For example, the control interface line 72 is used RS232C standard interface. However, other standard interfaces may be used.

The UPS 1 includes a main power supply circuit 11, a backup battery circuit 12, a power outage detection circuit 13, a switch 14 and a power-off switch 15. In addition, the UPS 1 has an output power detecting circuit 16, a control circuit 17, a memory 18 and a display unit 19.

The commercial power supply (AC: Alternate Current) from the plug 10 is supplied to the main power supply circuit 11, the backup battery circuit 12 and the power outage detection circuit 13. The main power supply circuit 11 is a circuit which stably outputs the commercial power supply from the plug 10. For example, the main power supply circuit 11 converts the AC to DC (Direct Current), converts the converted DC to the AC and outputs the AC 100 volt which is removed noise or the like.

The backup battery circuit 12 includes a rechargeable battery. The backup battery circuit 12 supplies the AC power from the battery in the event of a power outage. In addition, when the battery charge is not sufficient, the battery backup circuit 12 charges the battery power from the commercial power supply.

The power outage detection circuit 13 detects a power outage of the commercial power supply. The power outage includes a case that the input of the commercial power supply is disconnected when the plug 10 falls out. The power outage detection circuit 13, when detecting the power outage, switches the switching circuit 14 from the output of the main power supply circuit 11 (a side 'a' in FIG. 1) to the output of the backup battery circuit 12 (a side 'b' in FIG. 1).

The output power detecting circuit 16 detects the power of the AC power (AC 100 volts) which is output to the outlet CS from the switching circuit 14. The control circuit 17 receives a outage detection signal of the power outage detection circuit 13, and notifies the power outage to the UPS control software 60 in the server 2 through the control interface line 72. Further, the control circuit 17 receives the detected power output from the output power detecting circuit 16, and detects the shut down of the server 2. The control circuit 17, when detecting the shutdown of the server 2, turns off the switch 15, and stops the power supply to the server 2.

In addition, the control circuit 17, in response to a start instruction of the shutdown from the UPS control software 60 in the server 2 via the control interface line 72, turns off the switch 15 after the lapse of time which has been set in the start instruction, and stops the power supply to the server 2. The set time is set from the UPS 1 itself or the server 2. For example, the control circuit 17 has an arithmetic processing circuit (MPU: Micro Processing Unit).

The memory 18 holds the set time and the shutdown time of which the control circuit 17 measures, as described below. The display unit 19 is controlled by the control circuit 17, and displays the operating state and abnormal state of the UPS, which will be described later. For example, the display unit 19 has an indicator lamp, such as LED (Light Emitting Diode).

As illustrated in FIG. 2, the server 2 includes a power control circuit 24, one or more CPU chip 2A and 2B, a storage unit 26, a bridge circuit 27, a memory 28, a crossbar switch (or switch) 4, a plurality of input/output unit (IOU) 3A, 3B, . . . , 3N and an external port 30.

Each of the CPU chips 2A and 2B includes the CPU (Central Processing Unit) 20A and 20B and a cache memory 22A and 22B. The input and output units (hereinafter referred to as IOU) 3A~3N are connected to the IO devices such as a LAN (Local Area Network) device and a storage device. In the embodiment, the storage device 5 is connected to the IOU 3A. The storage device 5 is configured by a large-capacity storage circuit. For example, the storage device 5 is a database device. For example, the storage device 5 has a RAID (Redundancy Array Independent Disk).

Each of the CPU 20A, 20B in the CPU chip 2A and 2B is connected to the cache memory 22A, 22B, and is connected to the bridge circuit 27. The CPU 20A, 20B executes the desired application program under the operation of the OS, and performs processing operations.

In addition, the CPU 20A and 20B are connected to the main memory 28 and the internal storage unit 26 via the bridge circuit 27. The main memory 27 stores a variety of programs and parameters, the data. The UPS control software 60 described above is expanded to the main memory 28. The internal storage unit 26 is configured by non-volatile storage unit such as a hard disk drive (HDD). The internal storage unit 26 stores a variety of programs and parameters, data.

The external port 30 is connected to the control circuit 17 in the UPS 1, as depicted by FIG. 1, via the control interface line 72. In addition, the external port 30 is connected to the CPU chip 2A, 2B via the bridge circuit 27. The CPU 20A, 20B performs communication commands and data to the IOU 3A~3N through the bridge circuit 27 and the crossbar switch (or switches) 4. The bridge circuit 27 performs a bridge function to connect between the CPU 20A, 20B, the storage unit 26, the main memory 28, the external port 30, and the crossbar switch (or switches) 4.

The power control circuit 24 is supplied the AC power (AC 100 volts) from the UPS 1 via the power supply cable 70. The power control circuit 24 includes an AC (Alternate Current)/DC converter and a plurality of DC/DC converters. And the power supply control circuit 24 converts the AC power (AC 100 volts) from the UPS 1 to the DC power which has a required capacity (current value).

The power control circuit 24 supplies the DC power to the CPU chip 2A, 2B via power supply lines L3 and L4. In addition, the power control circuit 24 supplies the DC power to the storage unit 26 and the main memory 28 via power supply lines L2 and L5. In addition, the power control circuit 24 supplies the DC power to the external storage device 5, the switch 4 and the IOU 3A~3N via power supply lines L1 and L6.

In the server system 2, the CPU chip 2A, 2B, the storage unit 26, the bridge circuit 27, the main memory 28, the switch 4, the IOU 3A~3N and the storage device 5 receive the DC power from the power control circuit 24. Then, the CPU 20A, 20B run a firmware program and the application program under the control of the OS, using the cache memory 22A, 22B, the main memory 28, the storage unit 26 and the storage device 5. The CPU 20A, 20B run the UPS control program (the application program) and controls the UPS 1.

Returning to FIG. 1, the control circuit 17 in the UPS 1 measures time from the time of a stop command from the OS of the server 2 until time of the power-off of the server 2 in order to monitor the time required to shut down, and stores measured information in the memory 18. Further, the control circuit 17, in the monitoring of the shutdown time, statistically processes the data stored in the memory 18, and calculates the average value and standard deviation required to the shut down. Then, the control circuit 17 determines the abnormality from the calculation results and the measurement time. For example, the control circuit 17 determines the abnormality when the measurement time is equal to or greater than a value (=the average value+the standard deviation×3). In addition, the control circuit 17, when the shutdown has not been completed after elapsed the set time, extends the backup time for hour in which the battery capacity has.

(Power Disconnection Processing of Uninterruptible Power Supply Circuit)

Figure 3:
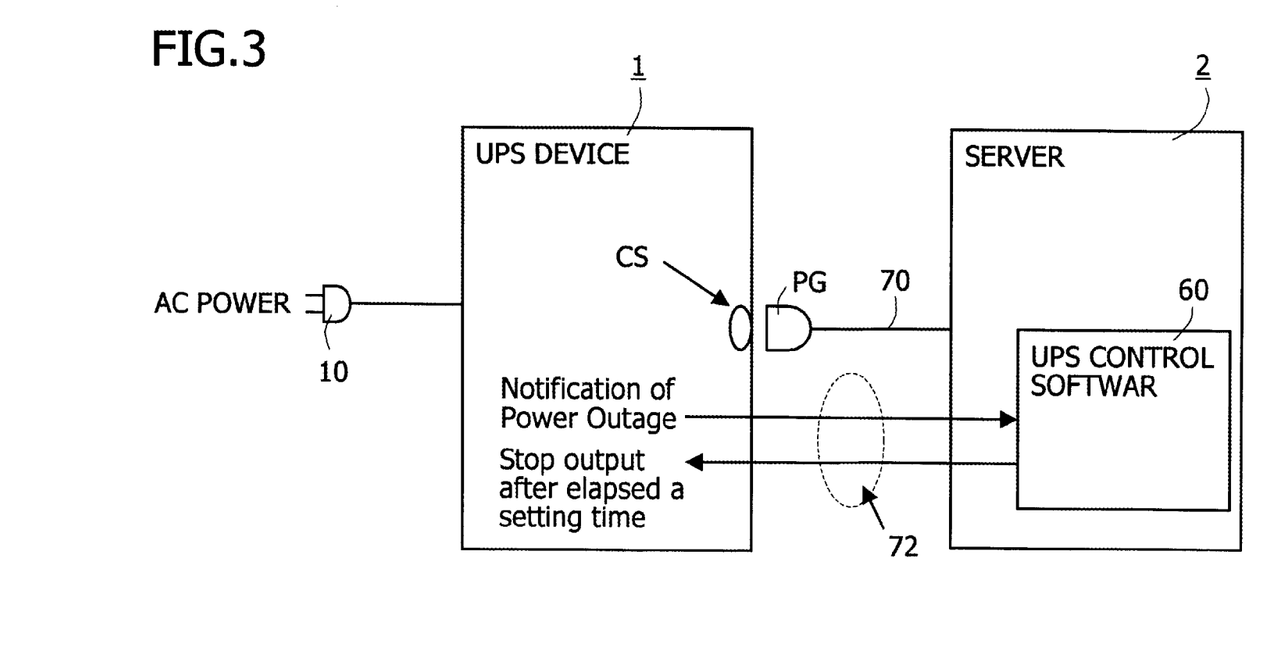
FIG. 3 is an explanatory diagram of power-off processing in the uninterruptible power supply circuit in a computer of FIG. 1 and FIG. 2.
Figure 4:
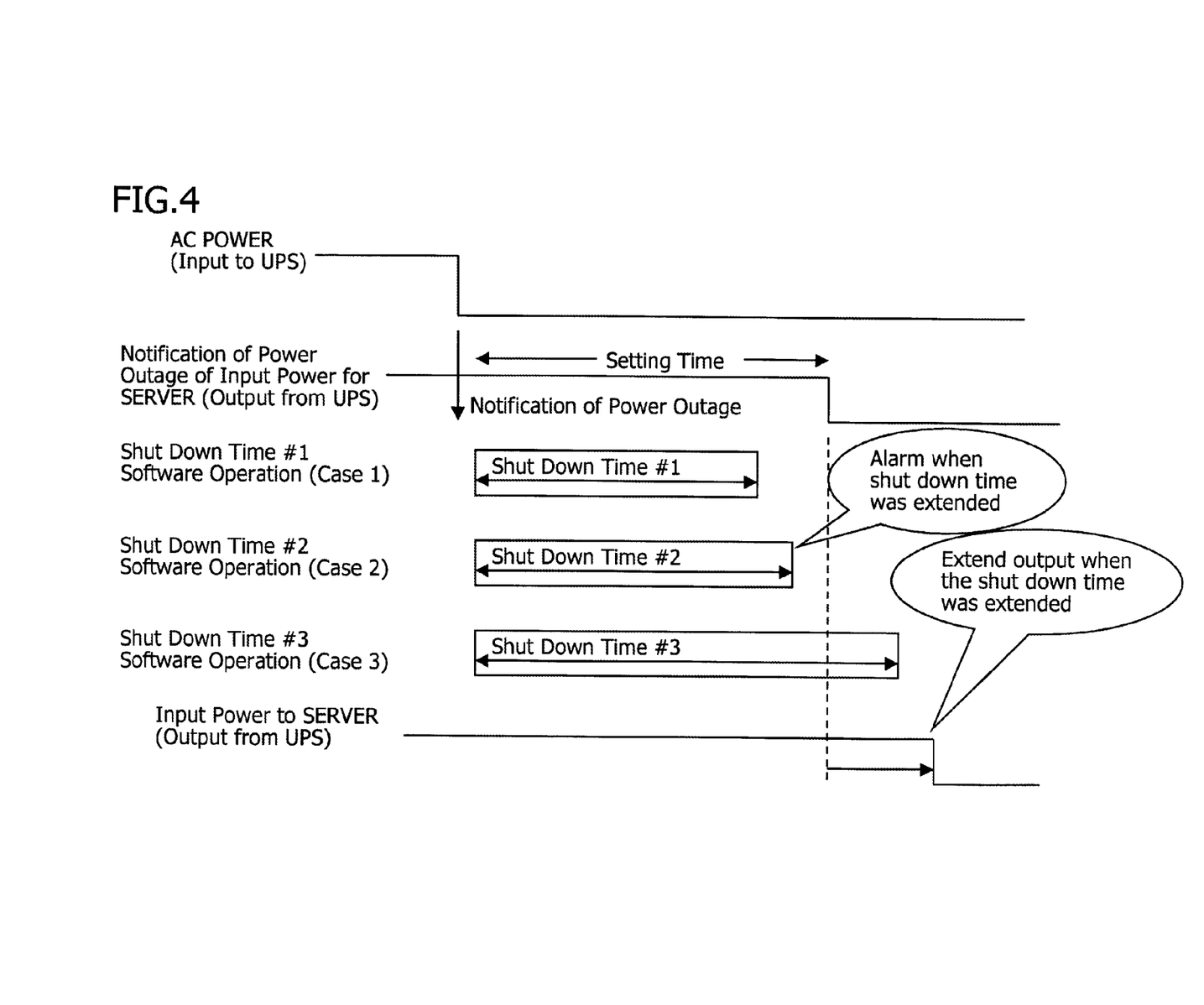
FIG. 4 is an explanatory diagram of a sequence of power-off processing in FIG. 1 and FIG. 2.

FIG. 3 is an explanatory diagram of the power disconnection processing of the uninterruptible power supply circuit and the server. FIG. 4 is a time chart of the power disconnection processing of the uninterruptible power supply circuit. As illustrated by FIG. 3, the UPS has the UPS output CS for supplying the power to the server. The plug PG of the power cable 70 of the server 2 is connected to the output outlet CS. As a result, the power is supplied to the server 2 from UPS In addition, the control interface line 70 is provided for connecting and communicating the UPS control software 60 which operates in the server to the control circuit 17 in the UPS 1. The UPS control software 60 receives a notification of the power outage from the UPS 1 via the control interface line 72. In addition, the UPS control software 60 transmits commands such as a start instruction of the shutdown to the UPS 1 via the control interface line 72.

The UPS control software 60, when receiving the notification of the power outage, transmits the power outage to the OS of the server 2. The OS starts the shutdown process. The UPS control software 60, in response to a start of the shutdown process of the OS, transmits a start command of the shut down to the UPS 1. That is, the UPS control software 60, when receiving the start instruction of the shutdown (close of processing), transmits the start command of the shutdown to the UPS 1 from an operator of the server or according to a schedule management of the OS.

The shutdown processing of the OS stores data and the setting information of the main memory 60, which was used by the application program and the firmware program, into the storage unit 26 and the storage device 5. Then the OS completes the processes of the firmware program and the application program. In addition, the OS stores the setting information of the OS into the storage unit 26 and the storage device 5, and then the OS is terminated.

FIG. 3 and FIG. 4 illustrate an example of operation sequence of the shutdown upon detection of power outage of the UPS 1. However, even when starting the shutdown from the operator of the server 2 or by the schedule management of the OS, the operation is similar to the operation in FIG. 4. As illustrated by FIG. 4, when a power outage occurs in the UPS input (AC power), the power outage detection circuit 13 in the UPS 1 detects the power outage, switches the switch 14 to the battery 12, and notifies the power outage detection to the control circuit 17. In addition, in the control circuit 17, the setting time until the power-off in FIG. 4 is set.

The control circuit 17 in the UPS 1 notifies the power outage to the UPS control software 60 in the server 2 via the control interface line 72. When the UPS control software 60 recognizes the power outage notification, OS starts the shutdown process. Since the UPS control software 60 is unable to control the UPS through the communication after the OS starts the shutdown process, the UPS control software 60 issues the instruction by a command, which stops the UPS output after a set time elapsed, through the control interface 72 before start of the shutdown process. The set time is usually set the time with a margin in order to complete the shutdown in the set time.

There is a change of the shutdown time of the server 2 due to the number of processing on the server 2 and a change of application on the server 2. For example, there is a tendency that the time required to shut down is longer when the database information increase if the server 2 is a database server. In other words, the shutdown time #2 at present time will be longer for the previous shutdown time 1.

When the shutdown time is longer in this way, there is a possibility that the shutdown process is not completed within the set time, the power output from the UPS 1 is cut in the middle of the process of shutting down, and the server 2 is terminated abnormally.

In the first embodiment, the control circuit 17 in the UPS 1 monitors time of shutting down for every shutdown, and prior alarming of the shutdown time is issued when the shutdown time becomes longer than usual. For example, when the control circuit 17 determines that the present shutdown time #2 is longer than the previous shutdown time #1, an alarming (or warning), of which the time of the shutdown is extended, is issued. By this prior alarming, it is possible to prevent abnormal operation of the server 2 in advance.

In FIG. 1, the control circuit 17 monitors the output power (that is, at the time of backup) of the output power detecting circuit 16 from the UPS 1 from the detection of a power outage. Then, the control circuit 17 detects that the shutdown of the server is completed from the output power and the power supply is disconnected while measuring the time required to the shutdown of the server 2. The control circuit 17 stores measured time in the memory 18 for later process.

The control circuit 17, when the shutdown time is extended than the previous shutdown time, displays the abnormal in the display unit 19 of the UPS 1. For example, when the control circuit 17 detects an error (or abnormal), the control circuit 17 controls the display unit 19 so as to illuminate the lamp.

For example, when the server 2 is placed in the environment of the unmanned as the equipment in the data center, there is a possibility not to recognize the error by the operator even though the error is displayed on the display unit 19 in the UPS 1. Therefore, the control circuit 17 stores the error in the memory 18. Then, when the server 2 is started at the next time (for example, power-on instruction), the control circuit 17 notifies the abnormal to the UPS control software 60 in the server 2 through the control interface line 72. The UPS control software 60 issues the warning. Thus, even in an unmanned environment, it is easy to recognize the error to the operator.

The control circuit 17 calculates an average value and the standard deviation of the shutdown time which were measured, and determines the abnormal of the shutdown time based on the calculated average value and standard deviation, by assuming that the distribution of the shutdown time makes a normal distribution (Gaussian). This avoids the measurement error, and it is possible to prevent unnecessary abnormal alarm.

Further, when the set time has elapsed, there is a case that the shut down has not been completed. That is, as the shutdown time #3 in FIG. 4, the shutdown may take more time than the set time. In a second embodiment, when the control circuit 17 compares the measured time with the set time and detects that shutdown did not completed even after the set time, the control circuit 17 controls the switch 15 so as to extend the time of the shutdown.

There is a tendency that the shutdown time is longer due to the increase of the amount of data when the operation time of the server system is longer. It is possible to provide a system which is shutdown properly by the prior alarming process or the time extended process of UPS 1 in the embodiments. Therefore, it is possible to prevent the destruction of data due to abnormal shutdown. In addition, it is possible to minimize the capacity of the battery, because there is no need for extra battery capacity with an excess backup time.

In addition, when there is a warning, the operator can take corrective action, such as to replace the battery or the uninterruptible power to a more capacity battery or uninterruptible power.

Figure 5:
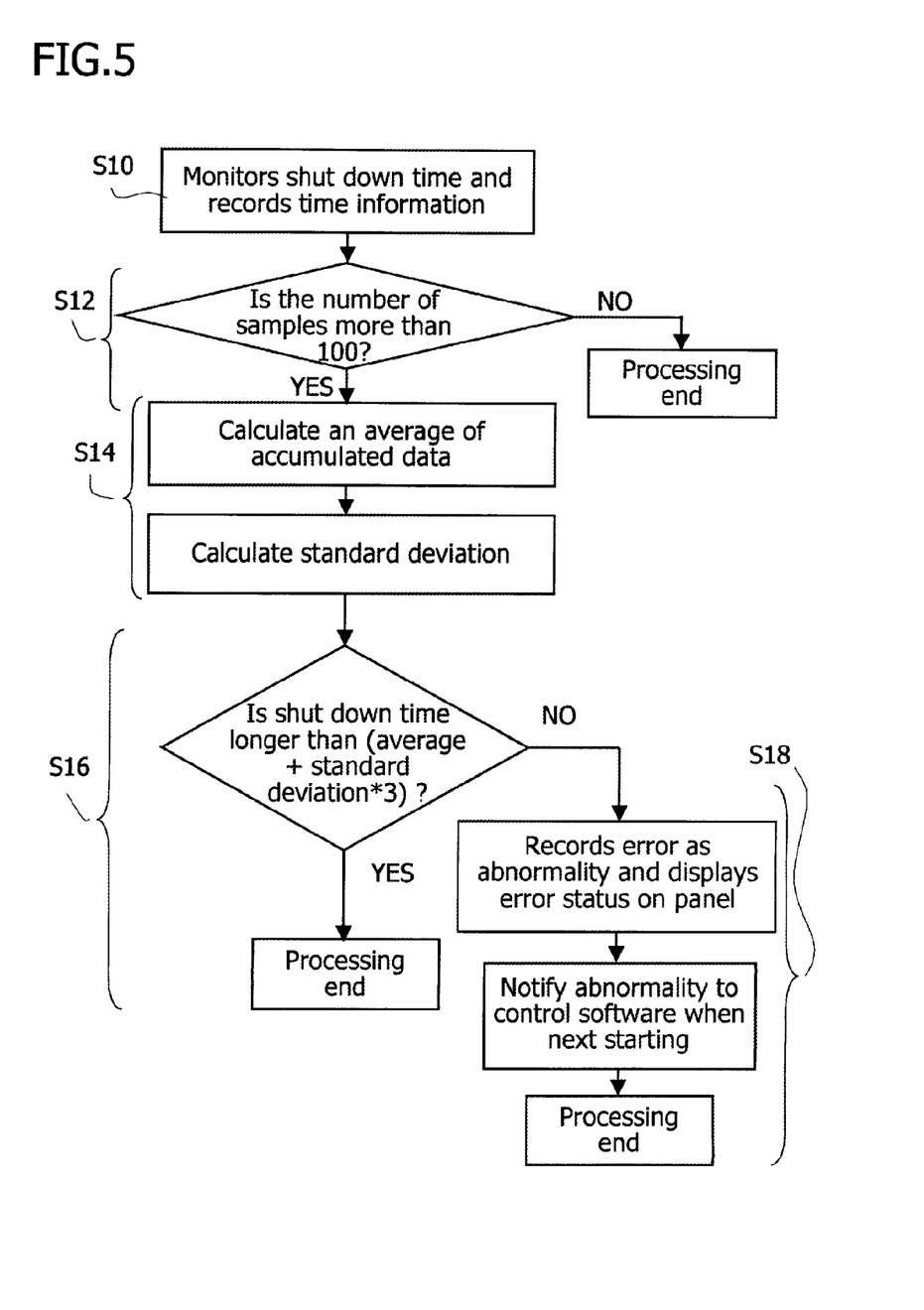
FIG. 5 is a flow diagram of a power-off process according to a first embodiment.
Figure 6:
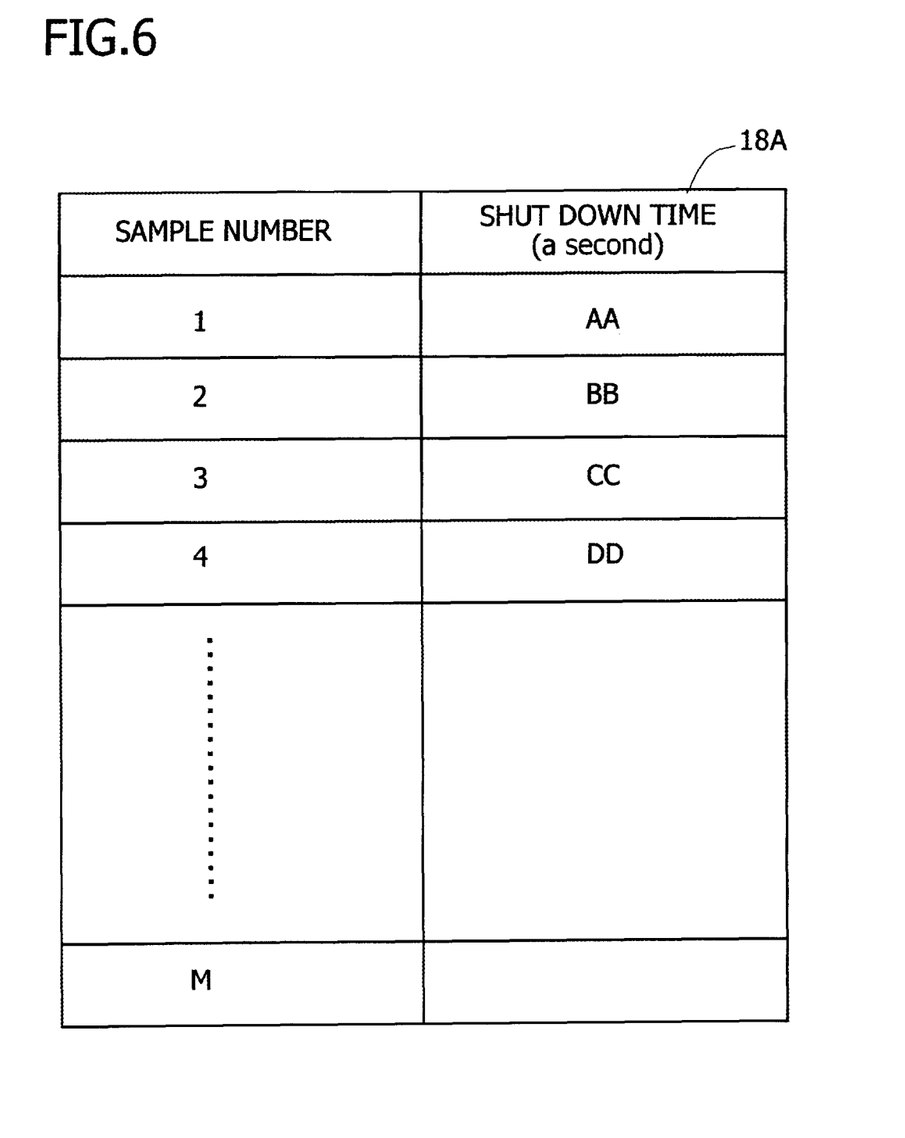
FIG. 6 is an explanatory diagram of a memory in FIG. 1 and FIG. 5.
Figure 7:
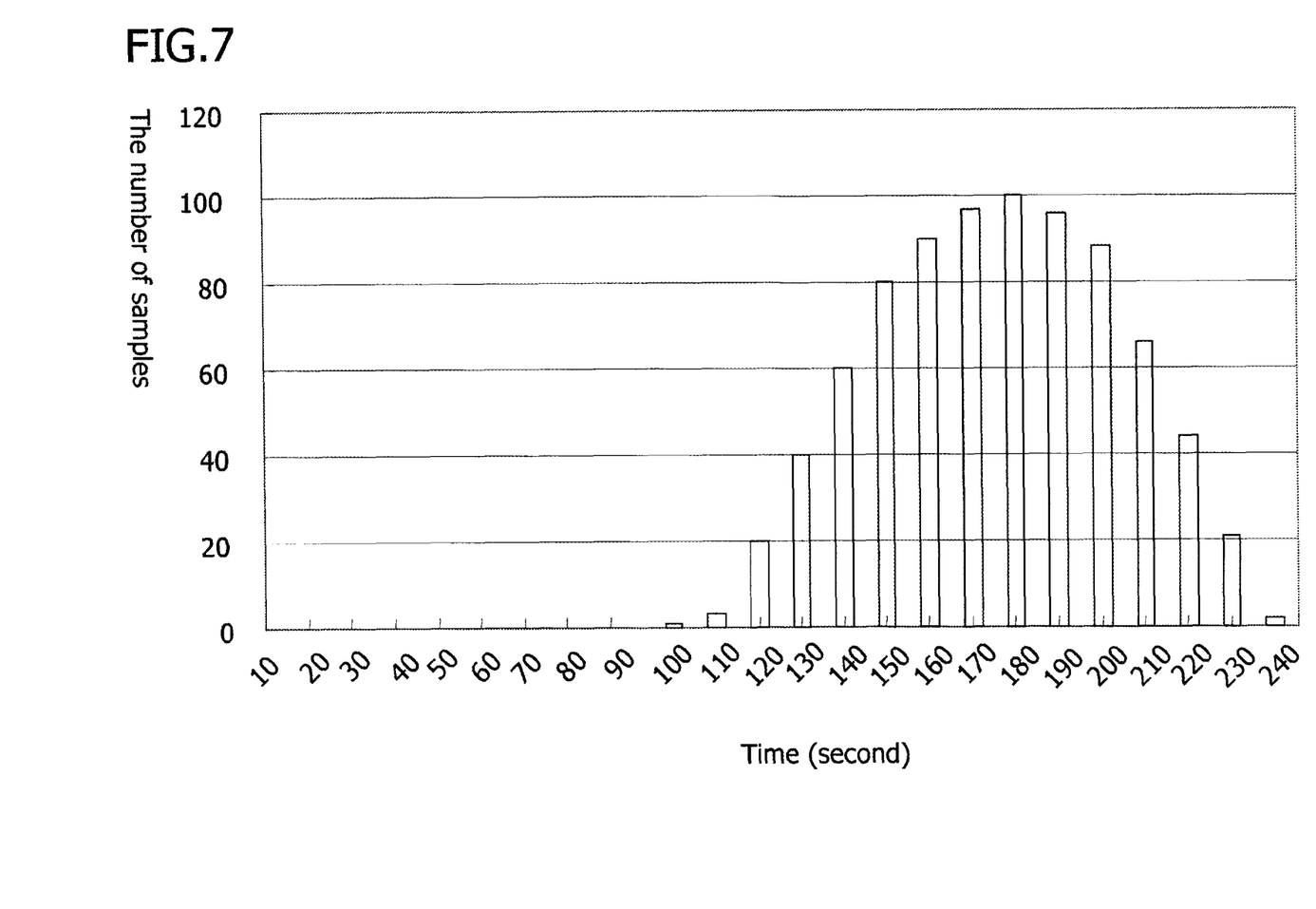
FIG. 7 is an explanatory diagram of statistical processing in FIG. 1 and FIG. 5.

First Embodiment of the Power Disconnection Process of the Uninterruptible Power FIG. 5 is a flow diagram of a power disconnection process according to the first embodiment. FIG. 6 is an explanatory diagram of a recording process of time information according to the first embodiment. FIG. 7 is an illustration of the distribution of the shutdown time according to the first embodiment. The processing in FIG. 5 is executed by the control circuit 17 in FIG. 1. Hereinafter, the processing in FIG. 5 will be described with reference to FIG. 6 and FIG. 7.

(S10) The control circuit 17 starts the measurement of the shutdown time in response to the detection of the power outage or the start notification of the shutdown from the server 2. The output power detection circuit 16 in the UPS 1 detects the output power by converting the output current to the outlet CS from the switch 15 to the voltage. When the current does not flow to the server 2, the output power of the output power detection circuit 16 is substantially zero. The control circuit 17 measures the shutdown time from the shutdown start notification from the server 2 until a time that the output power of the output power detecting circuit 16 becomes nearly zero. Then, the control circuit 17 stores the measured shutdown time in measurement time area 18A in the memory 18. As illustrated by FIG. 6, the measurement time area 18A in the memory 18 hold the shutdown time which has been measured by the control circuit 17 for each powering off process of the server 2. FIG. 6 illustrates an example that the shutdown times for each power off are managed by sample numbers.

(S12) The control circuit 17 determines whether the number of samples, which are stored in the measurement time area 18A in the memory 18, is greater than or equal to 100 (for example). The control circuit 17, when it is determined that the number of samples is less than 100 samples, ends the process. That is the control circuit 17 turns off the switch 15 and stops the power supply to the server 2 after elapsed the set time (referring to FIG. 4). Here, it is an example that the reference number of samples was 100, and it is necessary at least 2 samples for the abnormality determination described above. However, it is not possible to perform an accurate determination even if small number of samples. Therefore, by considering the variation in the measurement error and the shutdown time of the server 2, it is desirable that the sample is at least 3, preferably about 100 samples.

(S14) The control circuit 17, when the number of samples stored in the measurement time area 18A in the memory 18 is determined to be greater than or equal to 100 samples, calculates the average value of duration time (data) which has accumulated in the measurement time area 18A in the memory 18. In addition, the control circuit 17 calculates the standard deviation of duration time (data) which has accumulated in the measurement time area 18A in the memory 18.

(S16) The control circuit 17 determines the correctness of the shutdown time by using the average value and the standard deviation which were calculated. More specifically, the control circuit 17 compares the current measured shutdown time with a value (the average value+standard deviation×3) and determines whether the current measured shutdown time is longer than the value. As depicted by FIG. 6, the shutdown time distribution which was measured in same operating conditions (amount of data and processing power) of the server 2 represents the normal distribution (Gaussian). In addition, FIG. 6 indicates the shutdown time (in seconds) which was measured on a horizontal axis, and the number of samples (number) on the vertical axis. In the example of FIG. 6, the shutdown time variation of the same operating conditions indicate a normal distribution and the average value of the shutdown time is 180 seconds, and the standard deviation indicates about 25 seconds. Therefore, it is effective in the abnormality detection that the current measured shutdown time is compared with the basis of the degree (the average value+the standard deviation×3) and is determined whether the current measured shutdown time is longer than the degree. For example, in the example of FIG. 6, because the variation in the shutdown time are covered in the case of all same operating conditions when the reference is the degree of "180+25×3=255 (seconds), it is possible to realize accurately abnormality determination. The control circuit 17, when determined that the current measured shutdown time is not longer than the time (the average value+the standard deviation×3), determines the normal and ends the process.

(S18) On the other hand, the control circuit 17, when determined that the measured current shutdown time is longer than (the average value+the standard deviation×3), determines an abnormal and performs abnormality processing. That is, the control circuit 17 records the error as the abnormal in the memory 18, and lights the abnormality notification LED (Light Emitting Diode) in the display unit 19. In other words, it is alarmed to understand the operator to the abnormal state. In addition, because it is not recognized by the operator in the unmanned environment even though displayed in the UPS 1, the control circuit 17 notifies the abnormality to the UPS control software 60 via the control interface line 72 at the next system start-up. At the next system start-up, by warning from the UPS control software 60, it is easy to recognize the abnormal by the operator.

Further, by changing the operation mode of the system, it may change the shutdown time. For example, there is a case to change the operation mode to the file server from the database server. When there has been a change of the operation mode such, in order to not issue unnecessary the warning, the UPS control software 60 clears the data stored in the measured time area 18A in the memory 18. Therefore, it is possible to prevent an unnecessary warning when there is a change of the operation such as a great change of the shutdown time.

Second Embodiment of the Power Disconnection Processing

The following describes the processing according to an embodiment when the shutdown time (the shutdown time #3) is extended from the set time as illustrated by FIG. 4. In FIG. 4, when shutdown time #3, in the prior art, because the output of the UPS is stopped in the middle of the shutdown, the power of the server 2 will be broken suddenly, and it is occurred abnormal shutdown (called as dirty shutdown).

In the embodiment, by detecting that the server is not shut down after elapsed the set time in the case and extending the disconnection time, it is realized to perform normal shutdown. In addition, because the time can be backed up is limited due to the battery capacity of the UPS 1, if the extra time is longer, it may be an abnormal shutdown.

Figure 8:
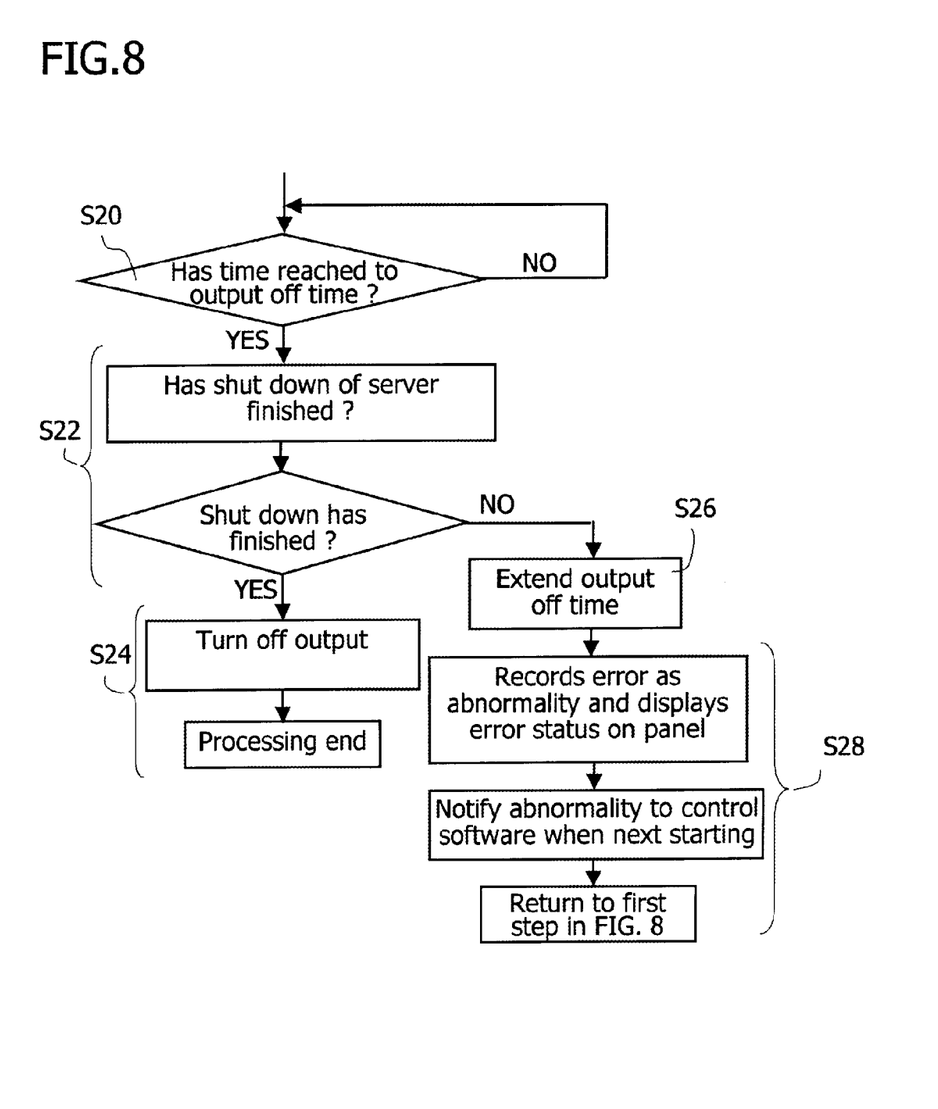
FIG. 8 is a flow diagram of a power-off process according to a second embodiment.

FIG. 8 is a diagram of the process flow according to the second embodiment.

(S20) The control circuit 17 in the UPS 1 determines whether or not a time is an output off time after elapsed the set time from the shutdown start instruction notified from the UPS control program 60.

(S22) The control unit 17, when it is determined that the time comes to the output off time, determines whether or not the server 2 completes the shutdown. That is, the control circuit 17 determines whether or not the output power of the detected power detection circuit 16 is substantially zero to judge whether or not the server 2 has completed the shutdown.

(S24) The control circuit 17, when it is determined that the server 2 has been completed the shutdown, turns of the output from the UPS and terminates the process. This is a normal process in the case.

(S26) The control circuit 17, when it is determined that the server 2 is not completed the shutdown, extends the time to turn off regardless of the setting time.

(S28) The control circuit 17, when the time is extended, determines to be abnormal, and performs the abnormal processing. That is, the control circuit 17 records the error as the abnormal in the memory 18, and lights the abnormality notification LED (Light Emitting Diode) in the display unit 19. In other words, it is alarmed to understand the operator to the abnormal state. In addition, because it is not recognized by the operator in the unmanned environment even though displayed in the UPS 1, the control circuit 17 notifies the abnormality to the UPS control software 60 via the control interface line 72 at the next system start-up. At the next system start-up, by warning from the UPS control software 60, it is easy to recognize the abnormal by the operator.

Third Embodiment of the Power Disconnection Processing

Figure 9:
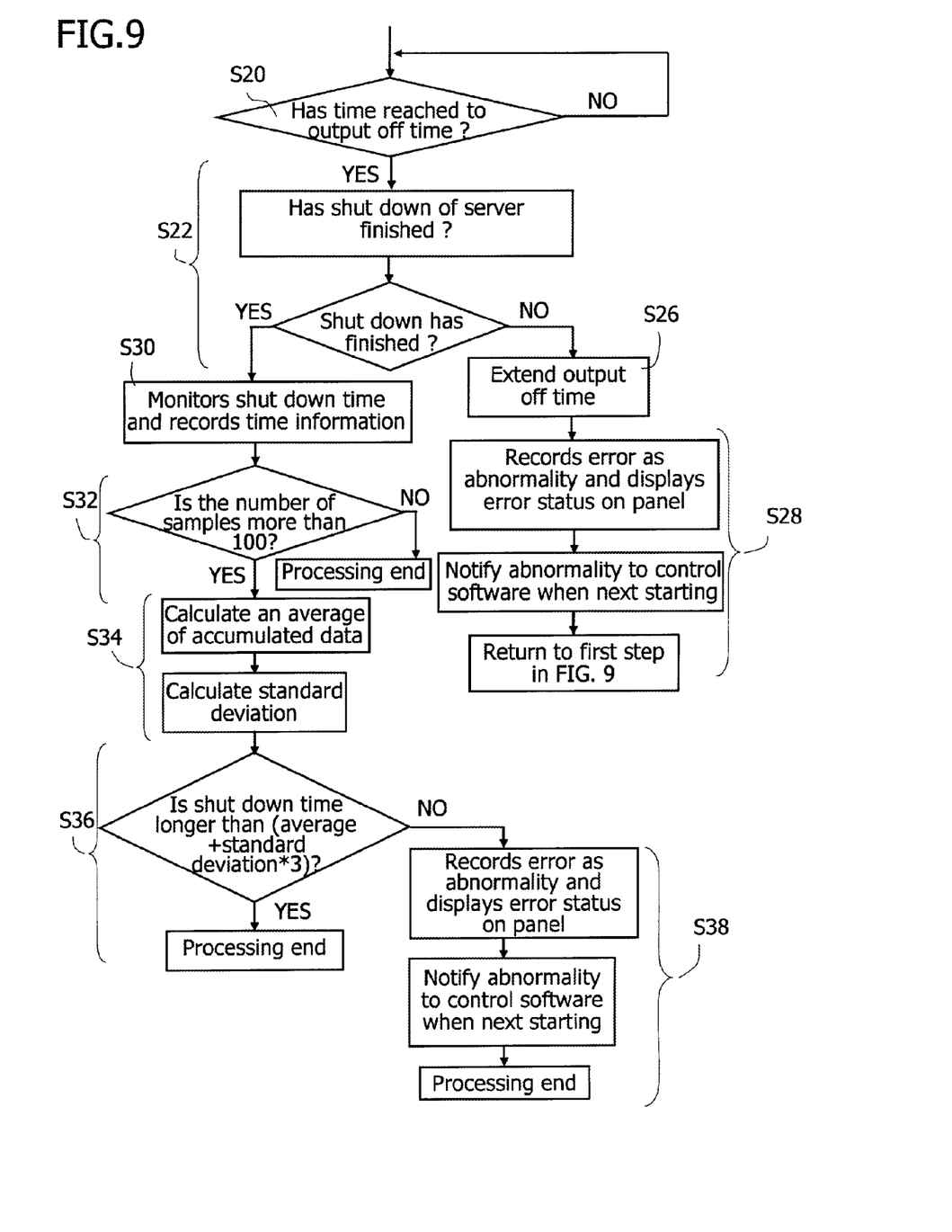
FIG. 9 is a flow diagram of a power-off process according to a third embodiment.

The following describes a third embodiment of a combination of the first embodiment and the second embodiment. FIG. 9 is a diagram of the process flow according to a third embodiment. In FIG. 9, same elements as that indicated by FIG. 8 are indicated by same symbols.

(S20) The control circuit 17 in the UPS 1 determines whether or not a time is an output off time after elapsed the set time from the shutdown start instruction notified from the UPS control program 60.

(S22) The control unit 17, when it is determined that the time comes to the output off time, determines whether or not the server 2 completes the shutdown. That is, the control circuit 17 determines whether or not the output power of the detected power detection circuit 16 is substantially zero to judge whether or not the server 2 has completed the shutdown.

(S26) The control circuit 17, when it is determined that the server 2 is not completed the shutdown, extends the time to turn off regardless of the setting time. Therefore, because the power from the UPS 1 does not turn off until completion of the shutdown, it is possible that the server 20 becomes the abnormal shutdown.

(S28) The control circuit 17, when the time is extended, determines to be abnormal, and performs the abnormal processing. That is, the control circuit 17 records the error as the abnormal in the memory 18, and lights the abnormality notification LED (Light Emitting Diode) in the display unit 19. In other words, it is alarmed to understand the operator to the abnormal state. In addition, because it is not recognized by the operator in the unmanned environment even though displayed in the UPS 1, the control circuit 17 notifies the abnormality to the UPS control software 60 via the control interface line 72 at the next system start-up. At the next system start-up, by warning from the UPS control software 60, it is easy to recognize the abnormal by the operator.

(S30) The control circuit 17 measures the shutdown time from the power outage or the shutdown start notification from the server 2 to the time that the output power of the output power detecting circuit 16 becomes zero or nearly. The control circuit 17, when it is determined that the server 2 has been completed the shutdown, records a shutdown time which was measured into the measurement time area 18A in the memory 18.

(S32) The control circuit 17 determines whether the number of samples, which are stored in the measurement time area 18A in the memory 18, is greater than or equal to 100 (for example). The control circuit 17, when it is determined that the number of samples is less than 100 samples, ends the process. That is, the control circuit 17 turns off the switch 15 and stops the power supply to the server 2 after elapsed the set time (referring to FIG. 4).

(S34) The control circuit 17, when the number of samples stored in the measurement time area 18A in the memory 18 is determined to be greater than or equal to 100 samples, calculates the average value of duration time (data) which has accumulated in the measurement time area 18A in the memory 18. In addition, the control circuit 17 calculates the standard deviation of duration time (data) which has accumulated in the measurement time area 18A in the memory 18.

(S36) The control circuit 17 determines the correctness of the shutdown time by using the average value and the standard deviation which were calculated. More specifically, the control circuit 17 compares the current measured shutdown time with a value (the average value+standard deviation×3) and determines whether the current measured shutdown time is longer than the value. The control circuit 17, when determined that the current measured shutdown time is not longer than the time (the average value+the standard deviation×3), determines the normal and ends the process.

(S38) On the other hand, the control circuit 17, when determined that the measured current shutdown time is longer than (the average value+the standard deviation×3), determines an abnormal and performs abnormality processing. That is, the control circuit 17 records the error as the abnormal in the memory 18, and lights the abnormality notification LED (Light Emitting Diode) in the display unit 19. In other words, it is alarmed to understand the operator to the abnormal state. In addition, because it is not recognized by the operator in the unmanned environment even though displayed in the UPS 1, the control circuit 17 notifies the abnormality to the UPS control software 60 via the control interface line 72 at the next system start-up. At the next system start-up, by warning from the UPS control software 60, it is easy to recognize the abnormal by the operator.

Thus, by combining the prior alarming with the time extended processing, it is possible to prevent the abnormal termination of the shutdown of the server 2, and it is realized that the power-off processing is stable. Because the uninterruptible power supply is provided a control circuit that measures the time until the completion of the power-off processing of the computer and the power detection circuit output circuit, and issues a alarm or extends the set time until the power-off based on the measurement time until the completion of the power-off process, it is possible to prevent that the power of the computer system is disconnected during operation and the abnormal shutdown is occurred.

Other Embodiments

In the above embodiment, an example has been described in a case of a single server; it can be applied to a plurality of servers. In addition, the backup power is not limited to the battery, and may be used such as a generator.

The foregoing has described the embodiments of the present invention, but within the scope of the spirit of the present invention, the present invention is able to various modifications, and it is not intended to exclude them from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An uninterruptible power supply device comprising:
    a main power supply circuit that supplies power to a computer;
    a back-up power supply circuit that supplies the power to the computer instead of the main power supply circuit in an event of a power outage;
    an output power detection circuit that detects output power which supplies to the computer;
    a control circuit that cuts a supply of the power to the computer after a set time elapses in response to a power-off instruction from the computer, monitors the output power which is detected by the output power detection circuit, measures a time until a completion of power-off process of the computer, and determines whether an abnormal end of the power-off process of the computer occurred due to a cut of the supply of the power by the set time based on a measured time; and
    a storage unit that stores the measured time for each of a plurality of measurements, and
    wherein the control circuit calculates an average time and a standard deviation value of the measured time from the plurality of measurements in the storage unit, and determines whether the abnormal end of the Dower-off process occurred by comparing the measure time in this time with the average time and the standard deviation value.

2. The uninterruptible power supply device according to claim 1, wherein the control circuit extends the set time based on the measured time.

3. The uninterruptible power supply device according to claim 1, wherein the control circuit determines whether the measured time is equal or longer than (the average time+the standard deviation value×3) and alerts the abnormal end of the power-off process when the measured time is equal or longer than (the average time+the standard deviation value× 3).

4. The uninterruptible power supply device according to claim 1, wherein the control circuit calculates the average time and the standard deviation value of the plurality of measured time in the storage unit when the number of the measured time is equal or more than a predetermined value, and executes the comparing the measure time with the average time and the standard deviation value.

5. The uninterruptible power supply device according to claim 2, wherein the control circuit alerts the abnormal end of the power-off process when the control circuit extends the set time and cuts the supply of the power supply.

6. A computer system comprising:
an uninterruptible power supply device that supplies power to a computer; and
the computer that executes power-of process after transmitting a power-off instruction to the uninterruptible power supply device,
wherein the uninterruptible power supply device comprising:
a main power supply circuit that supplies power to the computer;
a back-up power supply circuit that supplies the power to the computer instead of the main power supply circuit in an event of a power outage;
an output power detection circuit that detects output power which supplies to the computer; and
a control circuit that cuts a supply of the power to the computer after a set time elapses in response to the power-off instruction from the computer, monitors the output power which is detected by the output power detection circuit, measures a time until a completion of power-off process of the computer, and determines whether an abnormal end of the power-off process of the computer occurred due to a cut of the supply of the power by the set time based on measured time; and
a storage unit that stores the measured time for each of a plurality of measurements, and
wherein the control circuit calculates an average time and a standard deviation value of the measured time from the plurality of measurements in the storage unit, and determines whether the abnormal end of the Dower-off process occurred by comparing the measure time in this time with the average time and the standard deviation value.

7. The computer system according to claim 6, wherein the control circuit extends the set time based on the measured time.

8. The computer system according to claim 7, wherein the control circuit determines whether the measured time is equal or longer than (the average time+the standard deviation value×3) and alerts the abnormal end of the power-off process when the measured time is equal or longer than (the average time+the standard deviation value×3).

9. The computer system according to claim 7, wherein the control circuit calculates the average time and the standard deviation value of the plurality of measured time in the storage unit when the number of the measured time is equal or more than a predetermined value, and executes the comparing the measure time with the average time and the standard deviation value.

10. The computer system according to claim 7, wherein the control circuit alerts the abnormal end of the power-off process when the control circuit extends the set time and cuts the supply of the power supply.

* * * * *